(12) United States Patent
Seiler et al.

(10) Patent No.: US 7,656,417 B2
(45) Date of Patent: Feb. 2, 2010

(54) APPEARANCE DETERMINATION USING FRAGMENT REDUCTION

(75) Inventors: Larry D. Seiler, Boylston, MA (US); Laurent Lefebvre, Lachenaie (CA)

(73) Assignee: ATI Technologies ULC, Markham, Ontario ( * ) Notice: Subject to any disclaimer, the term of this patent is extended or adjusted under 35 U.S.C. 154(b) by 469 days.

(21) Appl. No.: 10/777,842

(22) Filed: Feb. 12, 2004

(65) Prior Publication Data

US 2005/0179700 A1 Aug. 18, 2005

(51) Int. Cl.
*G09G 5/00* (2006.01)
(52) U.S. Cl. .................. 345/614; 345/581; 345/582; 345/589; 345/421; 345/428; 345/613
(58) Field of Classification Search .............. 345/581, 345/582, 589, 421, 428, 613, 614
See application file for complete search history.

(56) References Cited

U.S. PATENT DOCUMENTS

| 5,977,977 | A | 11/1999 | Kajiya et al. |
| 6,108,007 | A | 8/2000 | Shochet |
| 6,157,365 | A | 12/2000 | Callway |
| 6,204,859 | B1 * | 3/2001 | Jouppi et al. ................ 345/592 |
| 6,232,979 | B1 | 5/2001 | Schochet |
| 6,476,807 | B1 * | 11/2002 | Duluk et al. ................ 345/582 |
| 6,501,483 | B1 | 12/2002 | Wong et al. |
| 2003/0030642 | A1 * | 2/2003 | Chen et al. ................ 345/519 |
| 2003/0184563 | A1 * | 10/2003 | Wiant, Jr. .................. 345/629 |
| 2004/0169651 | A1 * | 9/2004 | Everitt et al. ................ 345/426 |

* cited by examiner

*Primary Examiner*—M Good Johnson
(74) *Attorney, Agent, or Firm*—Vedder Price, P.C.

(57) ABSTRACT

A method for determining the appearance of a pixel includes receiving fragment data for a pixel to be rendered; storing the fragment data; and determining an appearance value for the pixel based on the stored fragment data, wherein a portion of the stored fragment data is dropped when the number of fragment data per pixel exceeds a threshold value enabling large savings in memory footprint without impacting perceivably on the image quality. A graphics processor includes a rasterizer operative to generate fragment data for a pixel to be rendered in response to primitive information; and a render back end circuit, coupled to the rasterizer, operative to determine a pixel appearance value based on the fragment data by dropping the fragment data having the least effect on pixel appearance.

12 Claims, 7 Drawing Sheets

APPEARANCE DETERMINATION USING FRAGMENT REDUCTION

FIELD OF THE INVENTION

The present invention generally relates to graphics processors and, more particularly, to the processing of pixels to improve image appearance.

BACKGROUND OF THE INVENTION

Computer graphics systems are known to include, for example, processors, memory and display devices. With ever increasing advances in computer applications, the need for improved display quality continues. High resolution display devices, for example, computer displays, high definition televisions (HDTV), projectors, and the like must be able to present high resolution, high quality images at rapid refresh rates. Video graphics circuits and systems must also be able to provide the data for such displays efficiently and effectively, often within highly competitive cost and compatibility restraints.

High resolution devices present an image to the viewer as an array of individual picture elements, or pixels. The pixels are each given a specific characteristic, for example, the color of the image at the particular pixel's location. The pixels are closely spaced relative to one another and the corresponding display filters the individual pixel color values to form a composite image. If the pixel filtering is performed properly, the viewer perceives the displayed array of pixels as a virtually continuous image. However, despite the filtering, the viewer remains sensitive to aberrations (e.g. color differences) in the image, and graphics systems must be designed to minimize these aberrations. Visual aberrations may result, for example, when the image is insufficiently sampled.

Aliasing occurs whenever the pixel sampling rate is significantly less than the highest frequency change in an image. A highly detailed image with numerous changes within a short time span will have a high frequency of change; a blank image has a zero frequency of change. If the frequency of pixel value sampling, for example, is less than twice the image's frequency of change, aliasing will occur and visual aberrations, such as improper or distorted coloring, will be introduced into the image. In addition to improper or distorted coloring, sampling artifacts may be introduced into the image.

Multisampling and super-sampling are two techniques used to provide order independent antialiasing. In super-sampling, multiple colors are computed per pixel. A drawback associated with super-sampling is that it is computationally extensive and requires a substantial amount of memory to implement. For example, if there are eight samples per pixel, super-sampling requires computing and storing eight colors per pixel. In typical applications the number of samples may be quite large (e.g. greater than eight samples); thus, conventional super-sampling techniques require a memory large enough to maintain eight colors per pixel. The larger the memory, the greater the associated cost of the graphics system.

Multisampling provides for computing a single color per pixel, together with a mask of the sample positions within the pixel that are covered by the primitive being rendered. This reduces the computation required to determine pixel color. However, conventional multisampling techniques typically require a large memory as at least eight samples per pixel must be stored in the memory before the color associated with a particular pixel is determined. As memory is typically the most expensive portion of a graphics processing system, the larger memory required by multisampling results in the underlying graphics processing system being costly.

BRIEF DESCRIPTION OF THE DRAWINGS

The present invention and the corresponding advantages and features provided thereby, will be best appreciated and understood upon review of the following detailed description of the invention, taken in conjunction with the following drawings, where like numerals represent like elements, in which.

DETAILED DESCRIPTION OF THE INVENTION

Briefly stated, the present invention is directed to a method for determining pixel appearance including receiving fragment data for a pixel to be rendered; storing the fragment data; and determining an appearance value for the pixel based on the stored fragment data, wherein at least one of the stored fragment data is dropped when the number of stored fragment data per pixel exceeds a threshold value. The above method is performed on a graphics processor including a rasterizer operative to generate fragment data for a pixel to be rendered in response to primitive information; and a pixel appearance determination circuit, coupled to the rasterizer, operative to determine a pixel appearance value based on the fragment data by dropping the fragment data having the least effect on the pixel appearance. By performing the method of the present invention, frame buffer size may be significantly reduced; thereby, reducing the overall cost of a graphics processing system employing the present invention. Additionally, the resulting image quality remains the same, as the human eye is not able to perceive the color difference of a pixel element when multiple colors are blended together.

Figure 1:
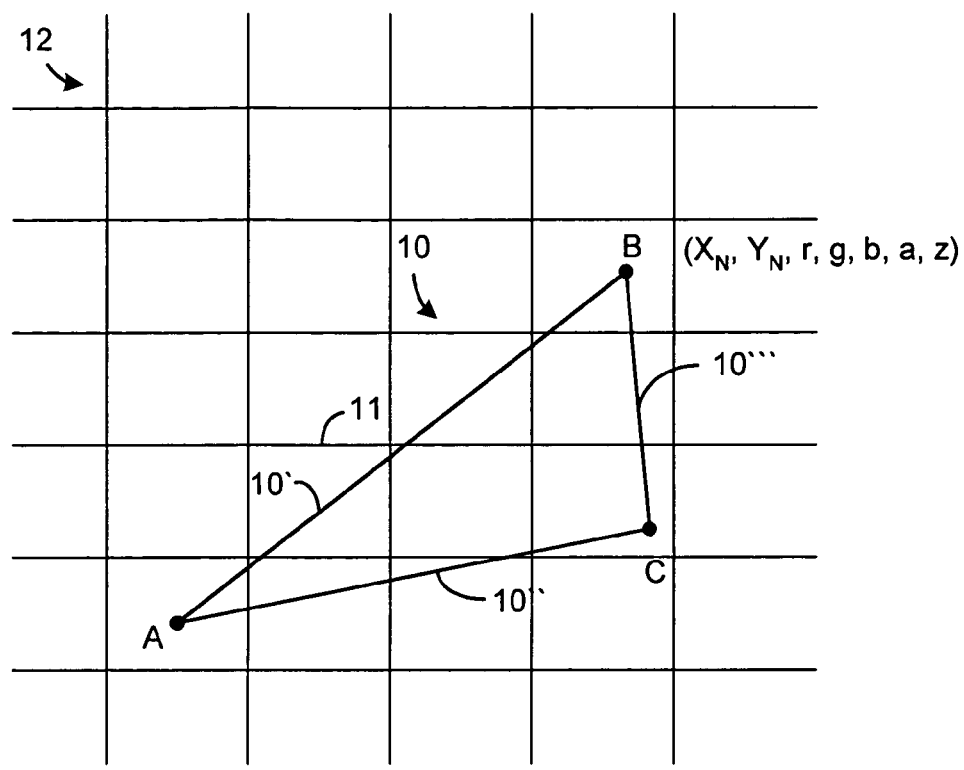
FIG. 1 is a schematic representation of a primitive being rendered onto two-dimensional space.

An exemplary embodiment of the present invention will be described with reference to FIG. 1-7E. FIG. 1 is a schematic representation of a primitive 10 being rendered onto a two-dimensional space 12, such as when an object is being rendered onto a suitable display device. The two-dimensional space 12 is represented by a plurality of intersecting horizontal and vertical lines that form pixels 11. A pixel is one of a series of points along a raster scan line that when viewed in the aggregate, provides an image that may be presented on a suitable display device (not shown) and perceived by a user. The primitive 10 is represented as a triangle, bounded by line segments 10'-10'''. The vertices (e.g. A, B, C) of the primitive 10 may include location coordinates (e.g. $X_N$, $Y_N$) representing screen space positioning, appearance values, for example color (e.g. r, g, b), luminance (a), and a depth value (e.g. z) representing the primitives position relative to a point of view. Thus, the primitive 10 to be rendered on the two-dimensional space 12 is part of a larger object to be displayed on a suitable display device (not shown).

As illustrated in FIG. 1, the line segments 10'-10''' that define the primitive 10 intersect and/or are contained within a plurality of pixels 11. The appearance (e.g. color) of the pixel 11 is determined by sampling the pixel 11 at the position intersected by the primitive and interpolating the appearance thereof based on the appearance value associated with the three vertices of the primitive 10. For example, the color associated with a given pixel 11 may be determined by multiplying the color associated with the vertices of the primitive 10 by the relative amount of the pixel 11 being intersected by the primitive 10.

Figure 2:
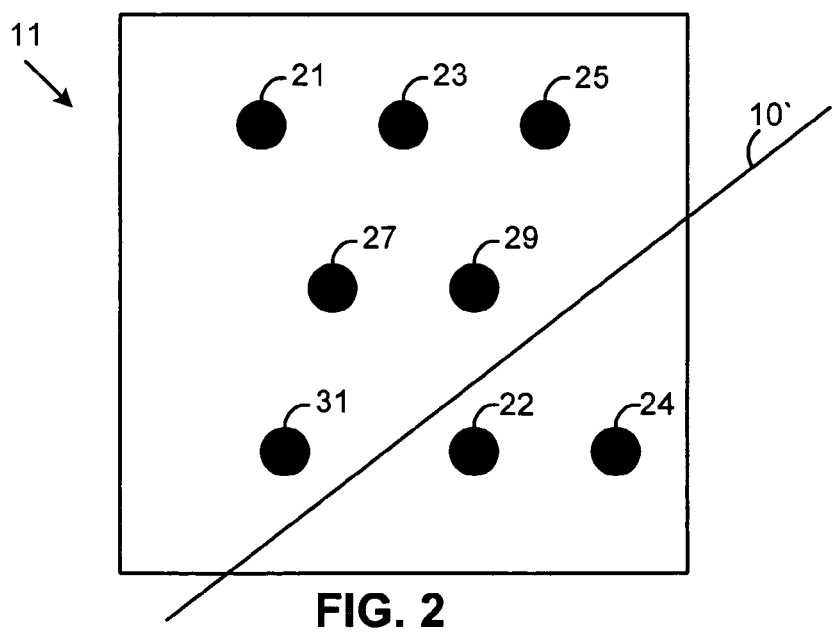
FIG. 2 is an exploded view of a pixel containing a fragment of the primitive to be sampled.

FIG. 2 is an exploded view of the pixel 11 that is intersected by line segment 10' of the primitive 10. The portion of the primitive 10 intersecting the pixel 11 is referred to as a fragment. A coverage mask may be applied to pixel 11, for example, corresponding to the plurality of sample points 21-31 within the pixel 11 where pixel appearance (e.g. color) values are obtained for subsequent processing. These sample points 21-31 may be provided, for example, by coverage mask logic (not shown), which may form part of a larger graphics processor (not shown). The sample points 21-31 are fixed with respect to each individual pixel 11. Thus, it can be readily determined as to which sample points lie within the fragment. As shown in FIG. 2, the darkened circles corresponding to sample points 22, 24 are within the fragment. In contrast, sample points 21, 23, 25, 27, 29 and 31 lie outside of the fragment. Thus, if each sample point 21-31 were assigned a given color value, the resulting color associated with pixel 11 would be $\frac{1}{4}*Color_{fragment}$, where "*" represents multiplication.

In multisampling applications, the color associated with a particular pixel is determined, in part, by each of the fragments that intersect the pixel. Thus, if three fragments intersect a particular pixel, the color associated with that particular pixel will be determined by the aggregate of the colors provided by each of the fragments, in ratios corresponding to the fragments coverage of the pixel.

Figure 3A:
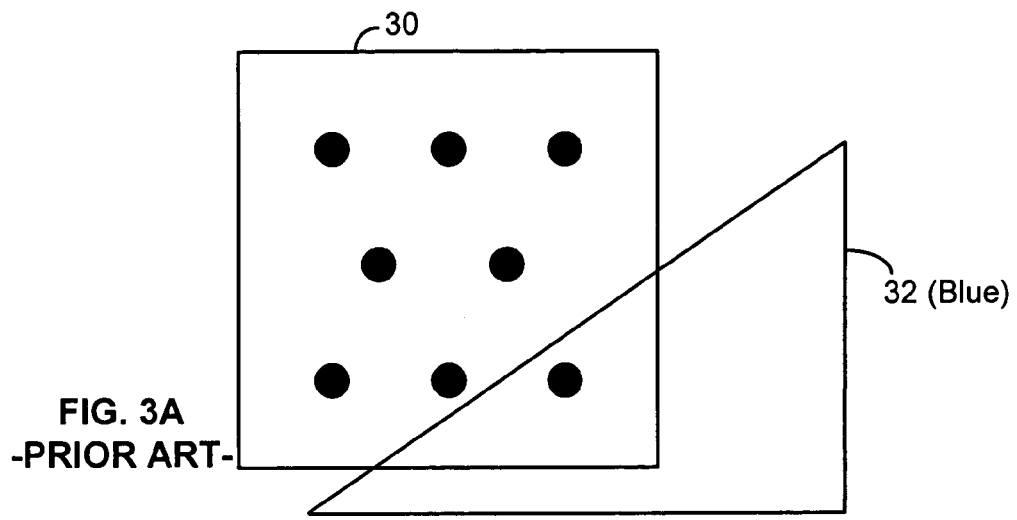
FIGS. 3A-3C are schematic representations of a pixel being intersected by primitive fragments during a multisampling operation.
Figure 3B:
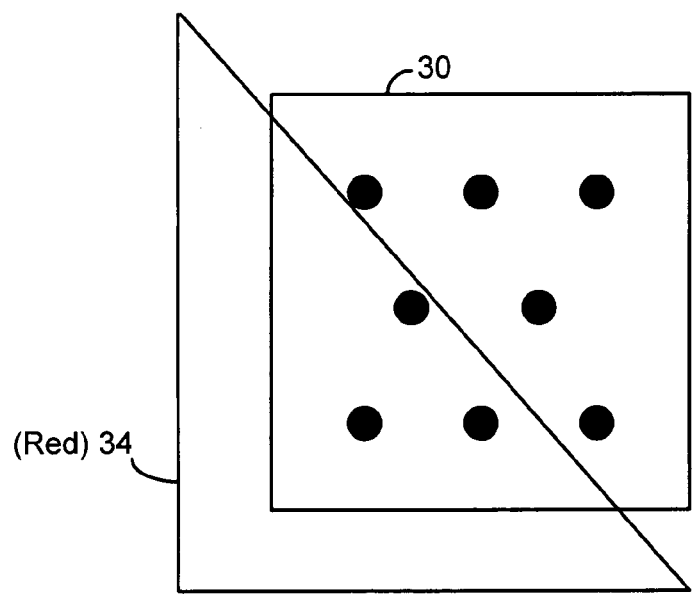
Figure 3C:
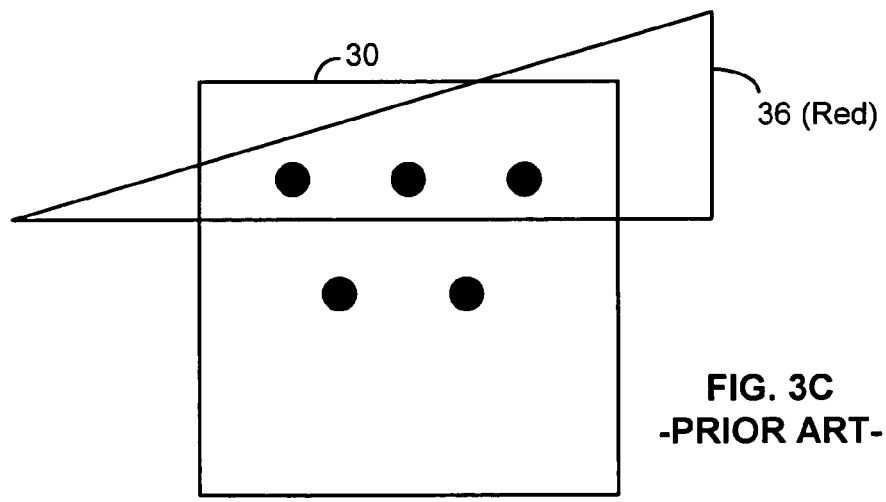

As illustrated in FIGS. 3A-3C, pixel 30 is at least partially covered, or intersected, by three fragments 32, 34 and 36. For example, fragment 32, having a color Blue, provides one component of the overall color of the pixel 30. Fragment 34, having a color Red, provides another component of the overall color of the pixel 30. Fragment 36, also having a color Red, provides another component of the overall color of the pixel 30. A drawback associated with conventional multisampling and super-sampling techniques is that they use a lot of frame buffer memory. The present invention overcomes the aforementioned and related drawbacks associated with conventional multisampling and super-sampling techniques by removing from consideration and subsequent calculation, the fragment having the least effect on pixel appearance thus reducing the memory footprint of a given pixel accordingly without perceptually reducing the image quality.

Figure 4:
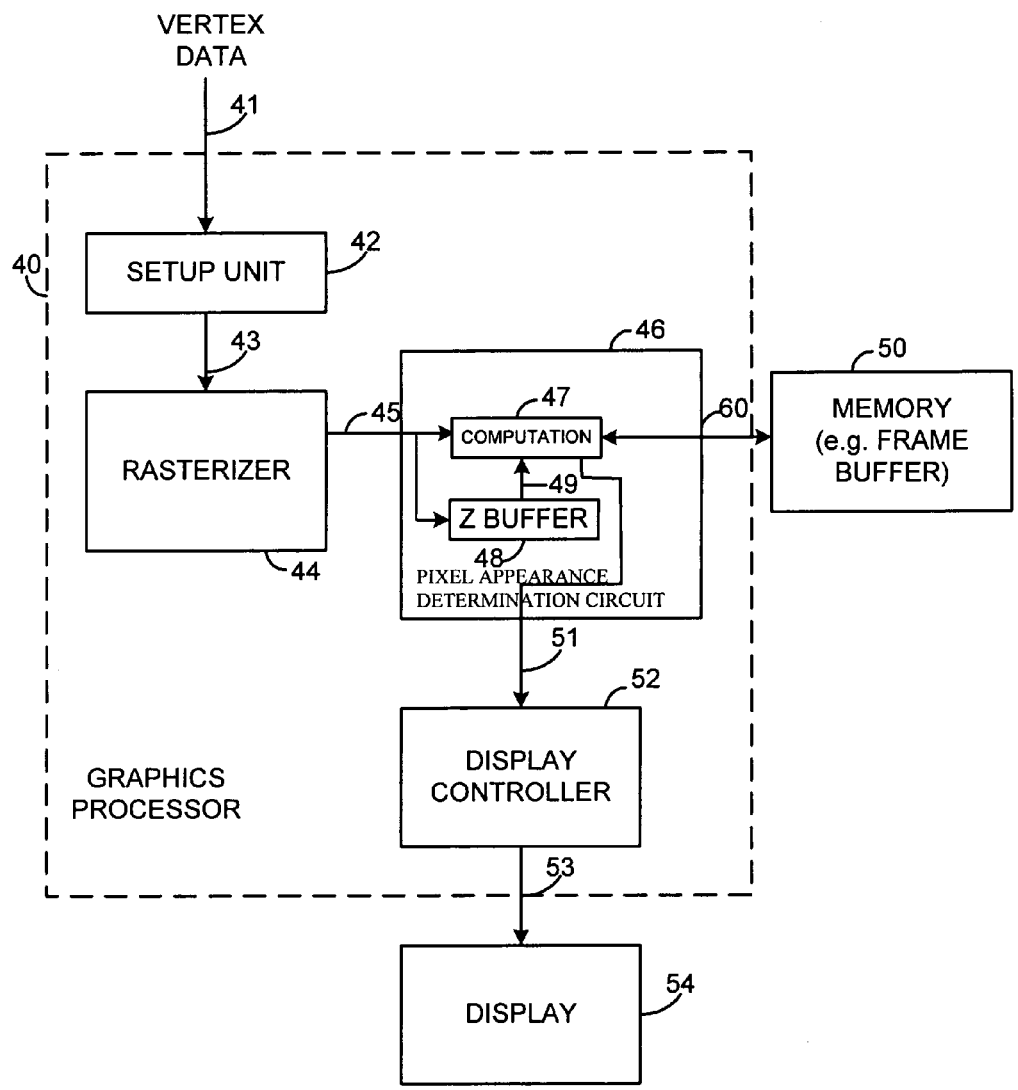
FIG. 4 is a schematic block diagram of a graphics processor operating according to an exemplary embodiment of the present invention.

FIG. 4 is a schematic block diagram of a graphics processor 40, operating according to an exemplary embodiment of the present invention. The graphics processor 40 includes a setup unit 42, a rasterizer 44, a pixel appearance determination circuit (PADC) 46 and a display controller 52. The PADC 46 is incorporated within the render back end circuitry (not shown) of the graphics processor 40. However, the PADC 46 can be implemented as stand alone circuitry. A memory 50, for example a frame buffer, is coupled to the PADC 46 and is operative to transmit and receive data 60 from the PADC 46. The memory 50 is configured to store up to N entries per storage location; where each storage location is associated with and addressed by a corresponding pixel. The value of N can be in the range of three or more, and preferably has a value of four. Thus, an exemplary memory 50 is configured to maintain up to four entries per pixel, where the entries are used to determine the appearance value of the corresponding pixel as discussed in greater detail below.

The memory 50 may be part of (e.g. on the same chip) the graphics processor 40 or external to the graphics processor 40. The memory 50 may include a single memory device or a plurality of memory devices. Such a memory device may include any memory element that stores digital data including, but not limited to, RAM, distributed memory such as servers on a network, or CD-ROM.

The setup unit 42 is operative to generate primitive information 43 in response to vertex data 41 provided by an application running on a host processor (not shown) or other suitable device. The primitive information 43 is transmitted to the rasterizer 44, which generates fragment data 45 (e.g. location, color, luminance, depth and blending or alpha values) for a pixel to be rendered in response to the primitive information 43. The fragment data 45 may be generated using standard techniques known to those or ordinary skill in the art.

The fragment data 45, corresponding to those portions of a primitive that intersect a given pixel is provided to the PADC 46. The PADC 46 is operative to determine the appearance value of a given pixel based on the fragment data 45, by dropping the fragment data having the least effect on pixel appearance as discussed in greater detail below. The color (e.g. r, g, b) and other appearance (e.g. luminance) components of the fragment data 45 are provided to a computation circuit 47 of the PADC 46. The depth (e.g. z-value) component of the fragment data 45 is provided to the z-buffer 48.

The z-buffer 48 stores the depth values of the fragments that intersect a given pixel used to determine which fragment to drop or otherwise dispose of. For example, the z-buffer 48 compares the received depth component of the received fragment data 45 to corresponding pixel depth values stored in the memory 50. If the z-buffer 48 determines that the incoming fragment data 45 will not be visible in the resulting image, a control (e.g. interrupt) signal 49 is provided to the computation circuit 47, causing the computation circuit 47 not to process the received fragment data 45. If the z-buffer 48 determines that the received fragment data 45 will be visible in the resulting image (e.g. not lying in a plane below currently stored information), the control signal 49 will not be asserted and the computation circuit 47 will process the received fragment data 45 in accordance with the present invention and transmit the processed fragment data 60 to the memory 50. Such fragment data processing is performed for each primitive that intersects a given pixel.

The pixel appearance value 51 is determined, for example, during a resolve period after all the fragment data 45 related to a particular pixel has been stored in the memory 50. The resulting pixel appearance value 51 is then provided to the display controller 52. The display controller 52 provides pixel data 53 in response to the pixel appearance value 51 formatted for proper presentation on a display 54. The display controller 52 can be any standard device capable of formatting incoming pixel data to be presented on a suitable corresponding display 54. The display 54 may be, for example, a CRT, an LCD, flat panel display or any suitable display device or combination thereof.

Figure 5A:
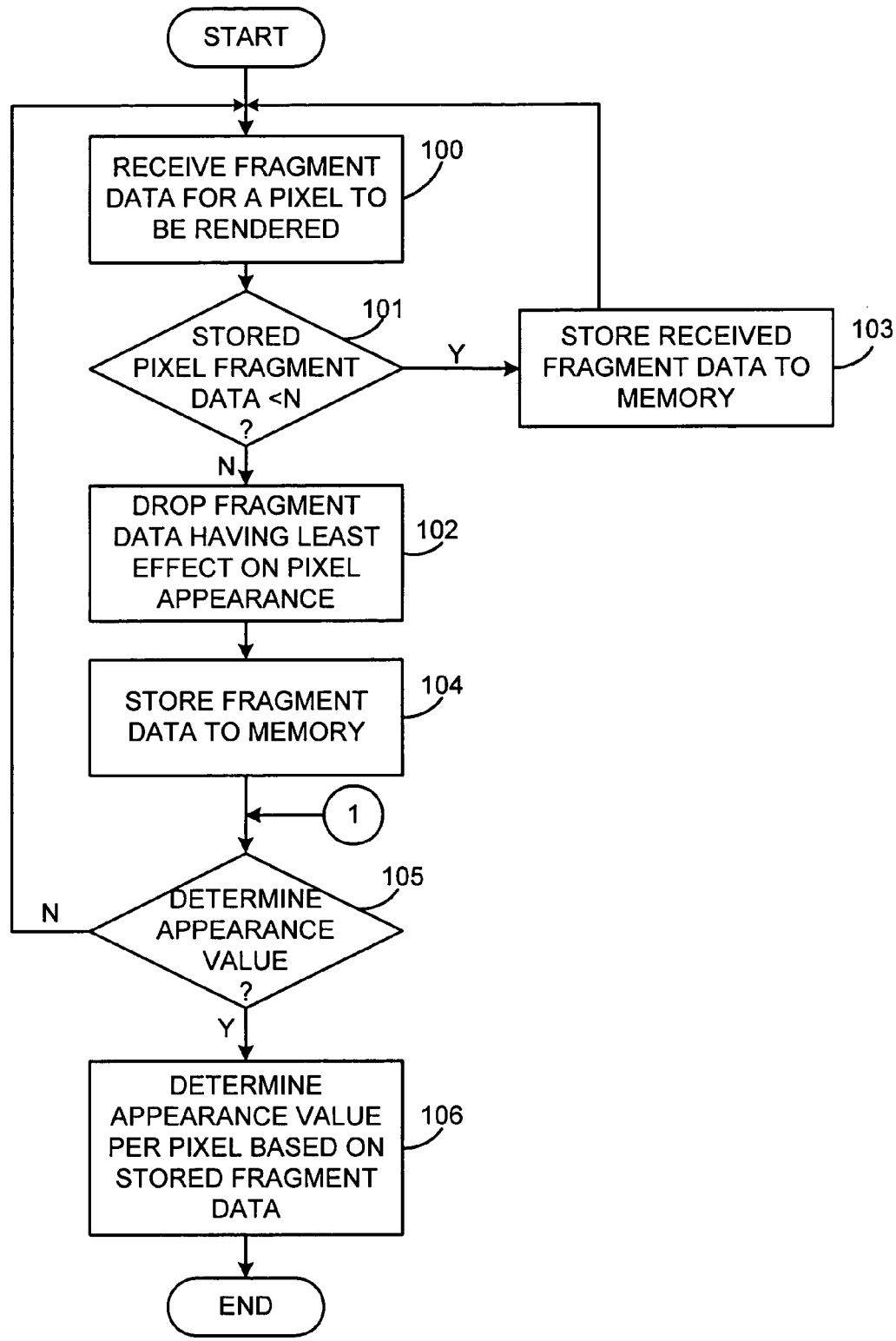
FIGS. 5A-5B is a flow chart illustrating the operations performed by the graphics processor illustrated in FIG. 4 when determining pixel appearance according to the present invention.
Figure 5B:
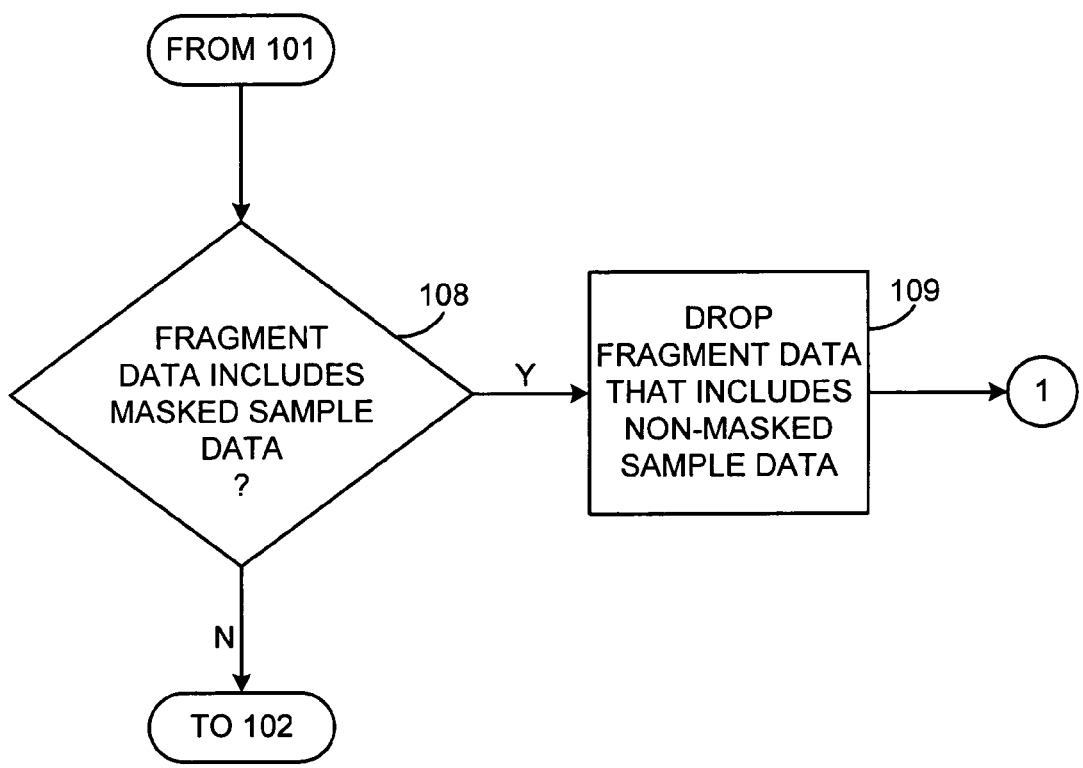
Figure 6A:
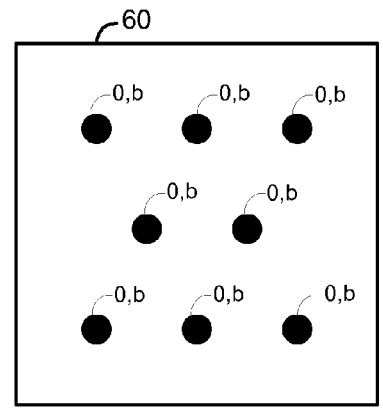
FIGS. 6A-6E are schematic representations illustrating pixel appearance value determination according to the present invention.

The operations performed by the PADC 46 when determining the pixel appearance value 51 will be discussed with reference to FIGS. 5-6. FIGS. 5A-5B is a flowchart illustrating the operations performed by the PADC 46 when determining pixel appearance values according to the present invention. FIGS. 6A-6E are schematic representations illustrating pixel appearance value determination according to the present invention. The process begins at step 100 where the PADC 46 receives the fragment data for a pixel to be rendered. Initially, the pixel 60 to be rendered is given an appearance value "b" representing, for example, the background color of the image. This is illustrated in FIG. 6A. Such background value is placed in location 0 within the memory 50, represented by (0,b) at T0.

In step 101, a determination is made as to whether the stored pixel fragment data exceeds the maximum number of fragments N that a pixel can store. This is accomplished, for example, by determining whether each of the four (e.g. 0-3) locations for the corresponding pixel within the memory 50 have values contained therein. If there is an available location within the memory 50, the received fragment data is stored or written to memory in step 103. The process returns to step 100 where new fragment data is received and stored in memory if there is an available location. The operations performed in steps 100, 101 and 103 are repeated until the four storage locations corresponding to the particular pixel have appearance values maintained therein. This is represented by FIGS. 6B-6D.

Figure 6B:
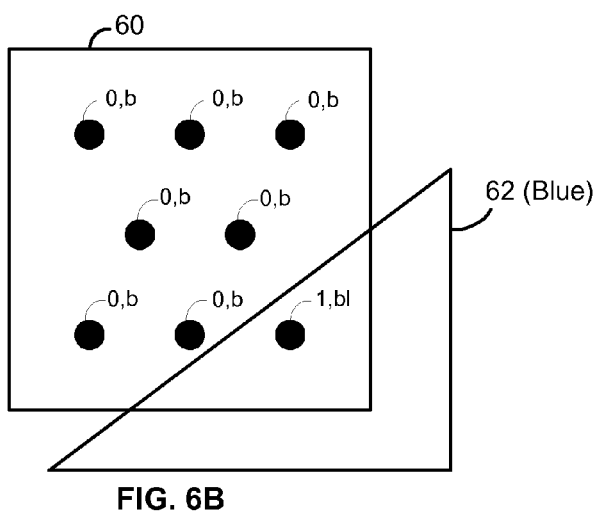
Figure 6C:
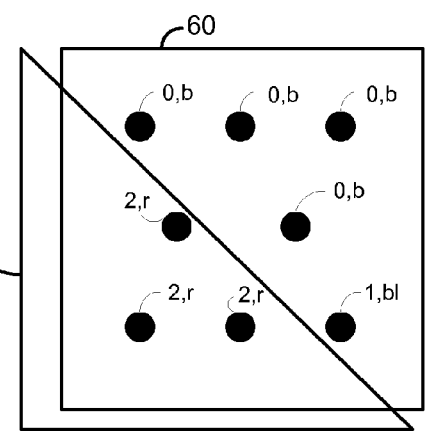
Figure 6D:
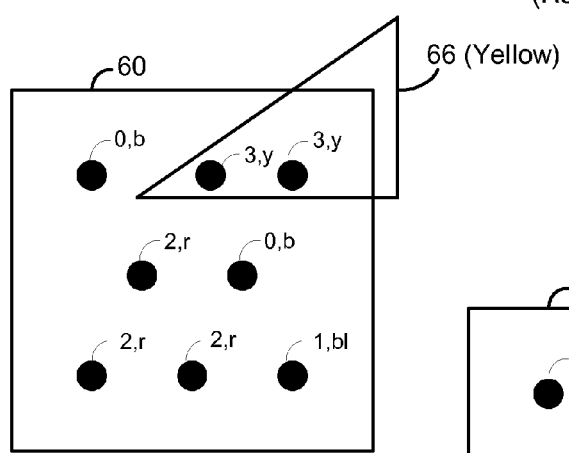

Referring to FIG. 6B, a first pixel fragment 62 having a color designation blue (b1) intersects the pixel 60 at T1. At this point, the color value "b1" is stored in memory location 1, represented by (1,b1). A second pixel fragment 64 having a color designation red (r) intersects the pixel 60 at T2. As the memory 50 is not full, the color value "r" is stored in memory location 2, represented by (2,r). A third pixel fragment 66 having a color designation yellow (y) intersects pixel 60 at T3. As the memory 50 is not full, the color value "y" is stored in memory location 3, represented by (3,y). After the color value "y" is stored, the memory 50 is full. When a fourth pixel fragment 68 is subsequently received by the PADC 46, the available memory space for pixel 60 is full. When this occurs, the process proceeds to step 102.

In step 102, the fragment data having the least effect on pixel appearance is dropped. This determination is made, for example, by the PADC 46 accessing the corresponding pixel location within memory 50 and determining which of the values stored therein has the least effect on pixel appearance. Other algorithms can also be used to determine which of the fragment should be dropped. For example, one could decide to drop the fragments that would cause the least color change of a given pixel by comparing the various colors present in the pixel and choosing the most redundant one. In this embodiment, we focus on the algorithm that chooses the fragment to be removed based on its coverage in the pixel. This is accomplished, for example, by the z-buffer 47 comparing the depth (e.g., z value) value of the incoming fragment data 45 to the corresponding depth values of the fragment data maintained within the memory 50. If the depth of the incoming fragment data 45 results in the fragment being rendered non-visible by a fragment already maintained in the memory, the incoming fragment data 45 will be discarded as that fragment will not be visible to the user. On the other hand, if there is a depth value match, or the depth of the fragment data 45 defines incoming pixel fragment as being visible to the viewer, the color (e.g., r, g, b) of the incoming fragment will be stored in the corresponding location within memory 50.

Figure 6E:
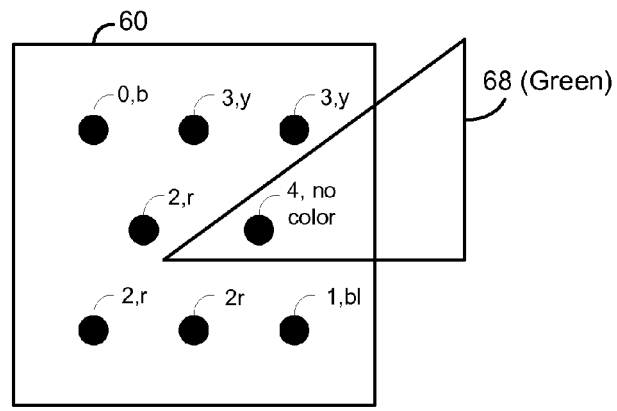

Referring to FIG. 6E, the current or most recently received pixel fragment 68, having a color designation green (g), and the initial pixel fragment 62 have the least effect on the resulting pixel appearance as each of these pixel fragments only intersects one sample point. In this situation, the PADC 46 will drop the most recently received pixel fragment 68 from being considered, by providing storage location 4 in memory 50 with a no color designation (4, no color). Thus, the pixel fragment 68 will not be considered when the PADC 46 determines the pixel appearance value (e.g., color) of the pixel 60 during the subsequent resolve period. For example, if this pixel 60 was to be resolved at this time, the resulting color would be $\frac{1}{7}$*Blue+$\frac{3}{7}$*Red+$\frac{2}{7}$*Yellow+$\frac{1}{7}$*Black. The no color memory location causing in this case a decrease in the valid sub-samples location from eight to seven.

In step 104, the fragment data 45 having the greatest effect of the appearance value of the pixel 60 is stored (e.g. written) to memory.

In step 105, a determination is made as to whether the graphics processor 40 has finished rendering the frame. If frame rendering has not been completed, the process proceeds to step 100 where new fragment data is received. On the other hand, if frame rendering is complete, the process proceeds to step 106 where the appearance value for the pixel 60 is determined based on the stored fragment data. This is accomplished, for example, by adding together the color values present in the memory 50, corresponding to the pixel as represented by equation 1 below:

$$\text{Color}_{location0}*\text{coverage}+\text{Color}_{location1}*\text{coverage}+\text{Color}_{location2}*\text{coverage}+\text{Color}_{location3}*\text{coverage}=1 \quad (1)$$

where "*" represents multiplication, and coverage represents the amount of the pixel (e.g. as a percentage of sample points) that is intersected by the corresponding fragment. Accordingly, the pixel appearance value (e.g., color) associated with pixel 60 will be represented as follows:

$$\tfrac{1}{7}*b+\tfrac{1}{7}*b1+\tfrac{2}{7}*y+\tfrac{3}{7}*r$$

where the no color value caused the valid subsamples to be dropped from eight to seven in the final resolve of the pixel. After calculating the appearance value, the process ends.

Some application programs provide fragment data that includes masked sample data. In those situations, the graphics processor 40 (FIG. 4) of the present invention handles the masked fragment data as illustrated in FIG. 5B. Referring to FIG. 5B, after it has been determined in step 101 that the stored pixel fragment data has not exceeded the threshold value, the process proceeds to step 108 where a determination is made as to whether the fragment data includes masked sample data.

If masked sample data is included in the fragment, the process proceeds to step 109 where the non-masked fragment sample data is dropped. The process then proceeds to step 105 where a determination is made as to whether the graphics processor 40 has finished rendering the frame. If frame rendering has not been completed, the process proceeds to step 100 where new fragment data is received and the fragment storage operations of steps 101 and 103 are performed for each pixel within the frame.

On the other hand, if masked sample data is not included in the fragment, the process proceeds to step 102 where the fragment having the least effect on overall appearance value is dropped in the same manner as discussed in greater detail above. Correspondingly, the process continues to steps 104-106 until the pixel appearance value has been determined.

Figure 7A:
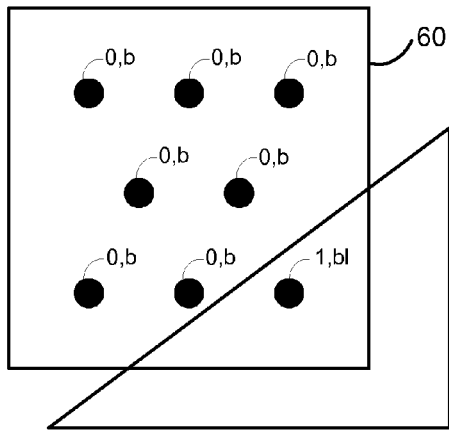
FIGS. 7A-7E are schematic representations illustrating an alternate pixel appearance value determination according to the present invention.
Figure 7B:
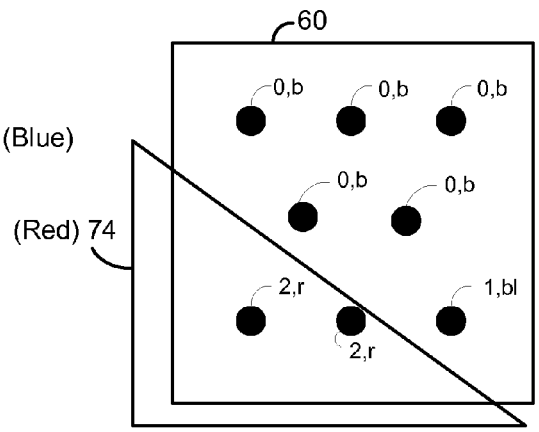
Figure 7C:
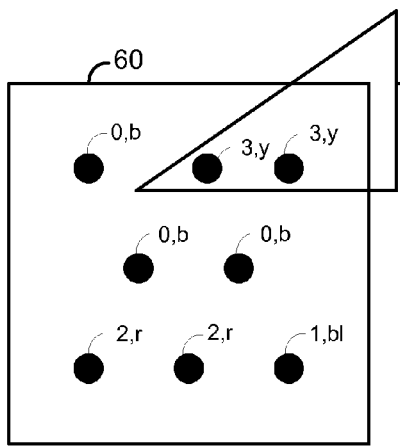
Figure 7D:
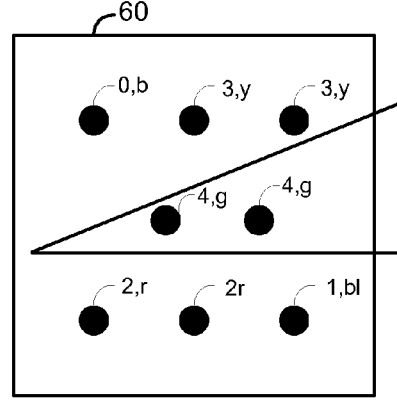
Figure 7E:
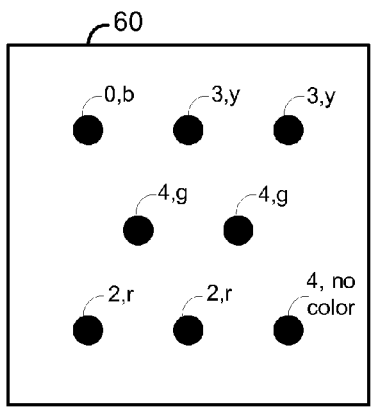

FIGS. 7A-7E are schematic representations illustrating an alternate pixel appearance value determination according to the present invention. FIGS. 7A-7E are substantially similar to FIGS. 6A-6E, except fragment 72 intercepting the sample point corresponding to memory location 1 has the least (e.g., smallest) effect on the overall pixel appearance (e.g., color); thus, fragment 72 and the corresponding sample point is dropped by having a no color designation applied thereto as illustrated in FIG. 7E. Thus, as shown in FIG. 7E, it is possible for previously stored fragment data to be discarded or dropped, as opposed to the incoming fragment data as illustrated in FIGS. 6A-6E. By performing the method of the present invention, the size of the memory (e.g. frame buffer) 50 can be reduced as fewer samples are required to determine pixel appearance values as compared to conventional methods. Therefore, the present invention provides a graphics processor that is more economical to implement.

The above detailed description of the invention and the examples described therein have been provided for the purposes of illustration and description. It is therefore contemplated that the present invention cover any and all modifications, variations and/or equivalents that fall within the spirit and scope of the basic underlying principles disclosed and claimed herein.

What is claimed is:

1. An apparatus comprising:
   a rasterizer operative to generate fragment data for a pixel to be rendered in response to primitive information; and
   a pixel appearance determination circuit, coupled to the rasterizer, operative to determine a pixel appearance value based on the fragment data by dropping the fragment data having the least effect on pixel appearance, wherein dropping the fragment data further includes assigning the fragment data to be dropped with a no color designation.

2. The apparatus of claim 1, further including a memory, coupled to the pixel appearance determination circuit, operative to store the fragment data, the stored fragment data being used to generate the pixel appearance value.

3. The apparatus of claim 2, wherein the memory includes N locations per pixel for storing the fragment data, and when an N+1 fragment data is provided for a pixel, the pixel appearance determination circuit drops one of the N+1 fragment data.

4. The apparatus of claim 3, wherein N has a value greater or equal to 3.

5. The apparatus of claim 1, further including a display controller, coupled to the render back end circuit, operative to provide the pixel appearance value to a display.

6. The apparatus of claim 1, further including a setup unit operative to generate the primitive information in response to vertex information.

7. The apparatus of claim 1, wherein the pixel appearance determination circuit is further operative to determine whether the fragment data includes masked sample data, wherein the masked sample data is not dropped, and wherein the masked sample data is used to determine the pixel appearance value.

8. The apparatus of claim 1, wherein assigning the fragment data to be dropped with a no color designation comprises reducing a number of valid sub-sample locations in the pixel.

9. A method for determining the appearance of a pixel, comprising:
   receiving fragment data for a pixel to be rendered;
   storing the fragment data; and
   determining an appearance value for the pixel based on the stored fragment data, wherein at least one of the stored fragment data is dropped, said fragment data having the least effect on pixel appearance, wherein dropping at least one of the stored fragment data further includes providing the dropped fragment data with a no color designation.

10. The method of claim 9, wherein said fragment data is dropped when the number of fragment data per pixel exceed a threshold value, wherein the threshold value is in the range of between 3 and 8.

11. The method of claim 9, wherein before storing the fragment data, the method includes determining whether a number of stored fragment data exceeds a threshold value, and when the stored fragment data exceeds the threshold value dropping the fragment data having the least effect on pixel appearance.

12. The method of claim 9, wherein before storing the fragment data, the method includes determining whether the fragment data includes masked sample data, wherein the masked sample data is not dropped, and wherein the masked sample data is used to determine the appearance value for the pixel.

* * * * *